(12) United States Patent
Barsim et al.

(10) Patent No.: US 12,475,710 B2
(45) Date of Patent: Nov. 18, 2025

(54) GENERATING VERIFIABLY REALISTIC MEASUREMENT DATA

(71) Applicant: Robert Bosch GmbH, Stuttgart (DE)

(72) Inventors: Karim Said Mahmoud Barsim, Stuttgart (DE); Melih Kandemir, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1043 days.

(21) Appl. No.: 17/346,858

(22) Filed: Jun. 14, 2021

(65) Prior Publication Data
US 2022/0012597 A1     Jan. 13, 2022

(30) Foreign Application Priority Data
Jul. 9, 2020 (EP) .................................... 20184909

(51) Int. Cl.
| | |
|---|---|
| *G06V 20/56* | (2022.01) |
| *G06F 18/213* | (2023.01) |
| *G06N 3/047* | (2023.01) |
| *G06N 3/088* | (2023.01) |
| *G06V 10/77* | (2022.01) |
| *G06V 10/774* | (2022.01) |

(Continued)

(52) U.S. Cl.
CPC ............ *G06V 20/56* (2022.01); *G06F 18/213* (2023.01); *G06N 3/047* (2023.01); *G06N 3/088* (2013.01); *G06V 10/7715* (2022.01); *G06V 10/774* (2022.01); *G06V 10/82* (2022.01); *G06N 3/084* (2013.01)

(58) Field of Classification Search
CPC ........ G06N 3/047; G06N 3/084; G06N 3/088; G06V 10/7715; G06V 10/774; G06V 10/82; G06V 20/56; G06F 18/213
See application file for complete search history.

(56) References Cited

U.S. PATENT DOCUMENTS
2021/0124999 A1\*   4/2021   Dia .......................... G06N 3/08

FOREIGN PATENT DOCUMENTS
| | | |
|---|---|---|
| CN | 109543740 A | 3/2019 |
| EP | 3572986 A1 | 11/2019 |

OTHER PUBLICATIONS

Santana et al., "Learning a Driving Simulator", Aug. 3, 2016, arXiv: 1608.01230v1, pp. 1-8 (Year: 2016).\*

(Continued)

*Primary Examiner* — Brent Johnston Hoover
(74) *Attorney, Agent, or Firm* — NORTON ROSE FULBRIGHT US LLP

(57) ABSTRACT

A generator for converting an input vector from a latent space to one or more records x of measurement data that is realistic with respect to a given application domain. The generator includes: a trained neural network that is configured to map the input vector to a set of distribution parameters that characterize a random distribution of realistic measurement data, where this random distribution is configured such that given said set of distribution parameters and at least one source of randomness, samples of realistic measurement data may be obtained; and a sampling module including a random or pseudo-random number generator as a source of randomness and configured to sample the realistic measurement data from the random distribution.

17 Claims, 4 Drawing Sheets

(51) Int. Cl.
    *G06V 10/82*     (2022.01)
    *G06N 3/084*     (2023.01)

(56) References Cited

OTHER PUBLICATIONS

Kingma, et al., "Auto-Encoding Variational Bayes," Cornell University Library, 2014, pp. 1-14.
Santana et al., "Learning a Driving Simulator," Cornell University Library, 2016, pp. 1-8.
Doersch, "Tutorial on Variational Autoencoders," Cornell University Library, 2016, pp. 1-23.
Poursaeed, et al.: "Generative Adversarial Perturbations," 2018 IEEE/CVF Conference on Computer Vision and Pattern Recognition, (2018), pp. 4422-4431, XP033476416.
Search Report issued by the National IP Admin. of China in corresponding CN patent application No. 202110771821.5 on Mar. 8, 2025, with English translation.

\* cited by examiner

GENERATING VERIFIABLY REALISTIC MEASUREMENT DATA

CROSS REFERENCE

The present application claims the benefit under 35 U.S.C. § 119 of European Patent Application No. EP 20184909.8 filed on Jul. 9, 2020, which is expressly incorporated herein by reference in its entirety.

FIELD

The present invention relates to the generating of realistic measurement data that are particularly useful for the training of image classifiers.

BACKGROUND INFORMATION

Driving assistance systems for vehicles, vehicles that move through traffic in an at least partially automated manner, and robots that move and/or work autonomously all need a reliable perception of their environment, so that they can appropriately react to any objects and/or events in this environment. The majority of the information that is processed into such a perception is image information. Because even two images of the same situation that are acquired in direct succession are not perfectly identical, it is advantageous to use trained image classifiers for the processing. By virtue of their power for generalization, such classifiers are able to recognize objects and/or events even if they appear somewhat differently in new images. In this manner, the system, the vehicle, and/or the robot, may appropriately react even to unseen situations that have not been part of the training of the classifier.

The training of image classifiers requires training images that are labelled with "ground truth" regarding the objects and/or events that the classifier should ideally detect when processing the respective training image. Presently, this labelling is, to a large extent, a manual task. Therefore, obtaining labelled training images is expensive.

Therefore, it is advantageous to generate, from given labelled training images, synthetic yet realistic training images that can be given the already known labels without manual intervention. In this manner, the total cost of obtaining a sufficient quantity of training images for the training of the classifier may be greatly reduced. European Patent Application No. EP 3 572 986 A1 describes an exemplary method for generating such synthetic training images.

SUMMARY

In accordance with an example embodiment of the present invention, a generator is provided for converting an input vector z from a latent space Z to one or more records x of measurement data that is realistic with respect to a given application domain. Using this generator, an arbitrary amount of records x of realistic measurement data, e.g., images, may be obtained by sampling input vectors z from a random distribution in Z. For example, if the generator is trained using input vectors z sampled from a particular given random distribution in Z, this random distribution may also be used to sample input vectors z when the training is completed and the generator is being used for its intended purpose.

In accordance with an example embodiment of the present invention, the generator comprises a trained neural network that is configured to map the input vector z to a set of distribution parameters that characterize a random distribution of realistic measurement data x. This random distribution is configured such that given the set of distribution parameters produced by the neural network and at least one source of randomness, samples x of realistic measurement data may be obtained. The neural network may be of any suitable architecture. For example, it may be a convolutional neural network.

In accordance with an example embodiment of the present invention, the generator further comprises a sampling module. This sampling module comprises a random or pseudo-random number generator as a source of randomness. The sampling module is configured to sample the realistic measurement data x from the random distribution that is in turn characterized by the distribution parameters produced by the neural network.

A pseudo-random number generator generates, starting from some seed value, in a deterministic manner, a sequence of numbers that approximates the behavior of a sequence of random numbers. A truly random number generator may, for example, use noise produced in an electronic component, or decay events in a radioactive substance that happen at unpredictable times, as a source of entropy.

In particular, for one and the same input vector z, multiple records x of measurement data may be produced by sampling them from one and the same random distribution.

This path is a little more complicated than directly mapping the input vector z to the record x of realistic measurement data by the neural network in a fully deterministic manner, as it was done in previous generators. However, the inventors have found that the detour over the random distribution yields not only the x themselves, but also a well-defined likelihood $p(x|z)$ of any x given z.

For previous generators that directly outputted x, it was difficult, if not impossible, to obtain an approximation of $p(x|z)$ from a lot of x, z pairs. The reasoning behind the present generator is that if both x and $p(x|z)$ are needed, it is advantageous to determine $p(x|z)$ first and obtain the x from there. Here, the random distribution that is parametrized by the trained neural network for a given z corresponds to the sought $p(x|z)$.

In accordance with an example embodiment of the present invention, as it will be discussed in more detail later, the availability of $p(x|z)$ on top of the x allows, inter alia, a quantitative assessment of how realistic the records x of realistic measurement data really are with respect to the application domain at hand. For example, this assessment may form a well-motivated criterion as to when the training may be considered good enough and terminated. In particular, during the training of the generator, it may be detected if the performance of the generator starts to deteriorate due to overfitting or any other problem.

In a particularly advantageous embodiment of the present invention, the neural network comprises distinct layers and/or subnetworks that are configured to output different distribution parameters from the set of distribution parameters that characterize the random distribution of the x. This facilitates re-using the neural network architecture of a previous generator that was meant to directly map z to x without going over the random distribution. For example, if one of the distribution parameters of the random distribution is a mean, a layer of the neural network that was previously used to deliver x may be repurposed to deliver the mean instead, just by training the neural network to a different objective.

In a particularly advantageous embodiment of the present invention, the random distribution of the x is a multi-variate Gaussian distribution. Sampling of x from this distribution may then be done using a Gaussian source of randomness.

In particular, the set of distribution parameters may comprise at least:
- a projection matrix W representing cross-attribute correlation of a probabilistic principle component analysis, PPCA, of said distribution;
- standard deviations $\sigma_i$, each standard deviation $\sigma_i$ representing s per-attribute variation of said PPCA in an observation direction i; and
- a mean $\mu$.

In this manner, the observation model to which the x are made to conform is a low-rank Normal distribution N that may be written as:

$$x \sim N(x|\mu, WW^T + \mathrm{diag}(\sigma_i^2))$$

This is a low-rank Gaussian observation model $N(x|\mu, C)$ with mean $\mu$ and covariance $C = WW^T + \sigma_i^2$. Herein, $\mathrm{diag}(\sigma_i^2) = \sigma_i^2 I$ is a diagonal matrix with the of for all the observation directions i (I being the identity matrix).

For example, to audit the performance of the generator, records $x_A$ of actual measurement data may be evaluated against the observation likelihood $p(x|z)$ to estimate the data density $p(x_A)$. This may be achieved, e.g., by importance sampling to marginalize out the latent variable z.

One advantage of said low-rank Gaussian observation model is that there is a closed formula $$x = Ws + \mu + \mathrm{diag}(\sigma_i)\varepsilon$$

for drawing samples x from this distribution N. Herein, s and E are two independent standard normal variables that are sampled from standard normal distributions.

During the training of the generator, the x will be rated somehow (e.g., by a discriminator in an adversarial training setting) according to a given loss function, and from this rating, the neural network inside the generator has to learn. To this end, the loss should be propagated backwards through the neural network in order to determine changes to internal parameters (e.g., weights) of the neural network that may serve to improve the loss. The closed formula for x given above allows to propagate gradients back to the internal parameters inside the neural network by means of the well-known "local reparametrization trick".

For other random distributions of the x, the formula to determine x may be much more complicated. It is not even guaranteed for every such distribution that such a closed formula exists at all. Therefore, it is advantageous to train the network to yield distribution parameters of a random distribution that adheres to the local reparametrization trick.

The present invention also provides a method for obtaining measurement data x that is realistic with respect to a given application domain. In accordance with an example embodiment of the present invention, in the course of this method, the generator described above is provided. An input vector z is sampled from the latent space Z of the generator, which may, for example, be a latent space from which training input vectors z for the training of the generator were sampled. This input vector z is fed into the generator and mapped by the generator to one or more records x of the sought realistic measurement data.

In a particularly advantageous embodiment of the present invention, the input vector z is sampled based on a given sample $x_0$ of measurement data to which the sought measurement data x shall be similar. For example, if the generated realistic measurement data x is to be used for the supervised training of an image classifier or any other machine-learning model, and $x_0$ is a sample of measurement data that is already labelled with "ground truth", producing a different but still very similar variation of the $x_0$ ensures that the existing label for the $x_0$ will also be valid for the newly created x in the context of the application domain.

To this end, from the given sample $x_0$, the input vector $z_0$ that is most probable to be mapped to the given sample $x_0$ when fed to the generator is determined. As discussed before, by virtue of the x being drawn from a known random distribution, a link between $x_0$ and $z_0$ is provided. A multivariate perturbation S is then drawn from a given random (e.g., Gaussian) distribution and added to the determined input vector $z_0$, thereby forming the new sought input vector z.

In particular, determining the input vector $z_0$ may specifically comprise maximizing, with respect to z, the probability $p(z|x)$ of z given x that is given by $$p(z|x) = \frac{p(x|z)p(z)}{p(x)} \propto p(x|z)p(z).$$

Herein, $p(x|z)$ is the probability of x given z that is obtainable from the random distribution to which the neural network of the generator maps z. $p(z)$ is the probability of z according to a random distribution of z with which the generator was trained. The vector z for which $p(z|x)$ is maximal is determined as the sought input vector $z_0$.

The use of this inverse mapping from $x_0$ to $z_0$, which did not exist for previous generators, is not limited to generating variations of the $x_0$.

In a particularly advantageous embodiment, in accordance with an example embodiment of the present invention, the obtained measurement data x comprises at least one image, and the method further comprises training an image classifier using said image as a training image. As discussed before, by generating new realistic images x based on already labelled images, labels may be re-used. Thus, the total amount and variability of the training images may be augmented without having to label the new training images manually.

Images may be generated by any suitable modality, for example, with an optical or thermal still or video camera, with a radar sensor, with a lidar sensor, or with an ultrasound sensor.

In a further particularly advantageous embodiment of the present invention, the measurement data x comprises realistic measurement data of a first measurement modality for a situation for which actual measurement data of a second measurement modality is available. The method further comprises evaluating a current operational state of a technical system based at least in part on a fusion of the obtained realistic measurement data x of the first measurement modality and the actual measurement data of the second measurement modality. Here, the term "measurement modality" means that at least one particular physical quantity is being acquired with at least one particular sensor. For example, acquiring optical images is one measurement modality, acquiring radar images is another measurement modality, and acquiring lidar images is yet another measurement modality. Images of multiple measurement modalities may be combined into one "multimodal" image.

That is, the generator may be used for data imputation. For example, in a situation where the technical system is monitored by a plurality of sensors, some sensors might be missing data for some time periods, or the sensors might just take their measurement at different intervals that rarely coincide (e.g., one sensor measures every 5 seconds, and the other sensor measures every 7 seconds).

The invention also provides a method for training the generator described previously.

In the course of this method, input vectors z are sampled from the latent space Z of the generator. For example, the input vectors z may be drawn from a multi-variate Gaussian distribution. As discussed before, from these input vectors z, the generator produces one or more records x of realistic measurement data in two steps: First, the neural network of the generator determines the distribution parameters of the random distribution of the x. Second, the x are sampled from this random distribution by the sampling module of the generator.

The generated records x are pooled with records $x_A$ of actual measurement data of the application domain in which the records x have been generated. From this pool, records x* of measurement data are drawn at random and fed to a discriminator. The discriminator is configured to decide whether a record x* is a generated record x or a record $x_A$ of actual measurement data.

Generator parameters that characterize the behavior of the generator are optimized with the goal of making it harder for the discriminator to distinguish generated records x from records $x_A$ of actual measurement data. Discriminator parameters that characterize the behavior of the discriminator are optimized with the goal of better distinguishing generated records x from records $x_A$ of actual measurement data.

As discussed above, compared with the previous adversarial training of the generator in a Generative Adversarial Network, GAN, setting, the outcome of the neural network of the generator is not fed into the discriminator directly. Rather, there is the step of drawing the generated records x from the distribution parametrized by the neural network of the generator. This means that when the quality of the generated records x is rated by whatever loss function, the determined error will have to be propagated back to the neural network of the generator across that sampling step. To this end, the "local reparametrization trick" may be used if it is available for the chosen observation model embodied in the random distribution of the generator.

In a particularly advantageous embodiment of the present invention, the method further comprises determining, for test records x # of actual measurement data that are not used during the optimization of the generator and discriminator parameters, a likelihood p(x #) that the generator, in a particular training state, will output those test records x # as records x of realistic measurement data. This likelihood is a statistically motivated quantitative performance indicator for the generator.

As discussed above, the random distribution of the generator provides, for every z, the probability p(x|z) that given z, x will be observed. So the total likelihood p(x #) is that probability of x # given z, summed over all possible z in the latent space Z weighted with the probability p(z) of each z itself:

$$p(x\#) = \int_Z p(x\# \mid z) p(z) dz.$$

This integral may be estimated using an appropriate sampling approach. For example, an importance sampling may be used, with samples easily attainable from the distribution of z in Z.

This likelihood p(x #) is a valuable indicator for stopping the adversarial training. Previously, the training continued until the combined and/or alternating optimization of the generator and discriminator parameters converged with respect to the loss function used for the optimization. But the fact that the discriminator was no longer able to distinguish generated samples x from actual samples $x_A$ did not yet imply that the generated sample x was indeed realistic in the domain of application. The reason for the convergence could just as well be that the optimization had run into a dead end at some local optimum. Also, if the optimization was run for too long, it could overfit to the training data. The optimization could even sacrifice the goal that the output of the generator is realistic in the application domain for the sake of driving the loss function down a bit further.

If this happened, this was a bad thing. Because the generator and the discriminator have a fairly large number of parameters that take up a high amount of space, generator and discriminator parameters are typically not archived for every past epoch of the training. They are archived at much larger intervals, or not at all. Therefore, when it was discovered that the performance of the generator was no longer good, it was frequently not possible to roll the generator parameters back to a state where the generator was still better. So expensive computation time was lost.

Therefore, in a particularly advantageous embodiment of the present invention, the method further comprises: stopping the training in response to a decline in said likelihood p(x #), and determining a state of the generator parameters from before the beginning of this decline as the final generator parameters.

For example, during the training, the generator and discriminator parameters for a rolling horizon of a few epochs may be stored. While the training progresses, the likelihood p(x #) increases with a basically monotonous trend, possibly with some temporary setbacks. But when this trend is broken, it is clear that no better likelihood p(x #) can be achieved by continuing the training than there was while the trend was still intact. In this case, the generator parameters from before the beginning of the decline are still available and may be used as the final generator parameters.

As discussed above, realistic measurement data x that can now be easily obtained using the generator are frequently used to produce additional labelled training data for image classifiers in a situation where such training data is hard to obtain. Training of the image classifier is in turn performed in order to improve the perception of automated vision systems that actuate vehicles and/or robots and have to react to objects and/or events in the environment of such vehicles and/or robots. If more labelled training data can be provided with little or no further manual labelling, the end effect is therefore that the perception of said vision systems is improved and that the vehicle and/or robot performs actions that are more appropriate given the objects and/or events in its environment.

The present invention provides a further method. In accordance with an example embodiment of the present invention, this method starts with training the generator as discussed above. Also as discussed above, realistic measurement data x is obtained using the trained generator, and an image classifier is trained.

In accordance with an example embodiment of the present invention, images from the environment of a vehicle and/or robot are acquired using at least one sensor. This sensor may in particular be carried by the vehicle and/or robot, but this is not a requirement. The acquired images are processed using the trained image classifier. Based on the result of this processing, at least one actuation signal for actuating at least one vehicle and/or robot may be provided. In particular, the processing may comprise obtaining, for the acquired images, at least one classification score with respect to at least one of the available classes of the image classifier.

The generator and the methods described above may be computer-implemented at least in part. The generator and the methods may therefore be embodied in computer software. The invention therefore also provides a computer program with machine-readable instructions that, when executed by one or more computers, implement the generator described above, or cause the one or more computers to perform one or more of the methods described above. Control units for vehicles or robots, as well as other embedded systems, are also capable of executing pre-stored machine-readable instructions and are therefore also to be regarded as computers.

The present invention also provides a non-transitory machine-readable storage medium, and/or a downloadable product, with the computer program. A downloadable product is a digital product that may be transferred over a data network, i.e., downloaded by the user of the data network. For example, such a downloadable product may be sold in an online shop for immediate fulfilment and download.

A computer may be equipped with the computer program, and/or with the non-transitory machine-readable storage medium and/or downloadable product.

Further improvements of the present invention are detailed in the following in combination with a description of preferred embodiments using Figures.

DETAILED DESCRIPTION OF EXAMPLE EMBODIMENTS

Figure 1:
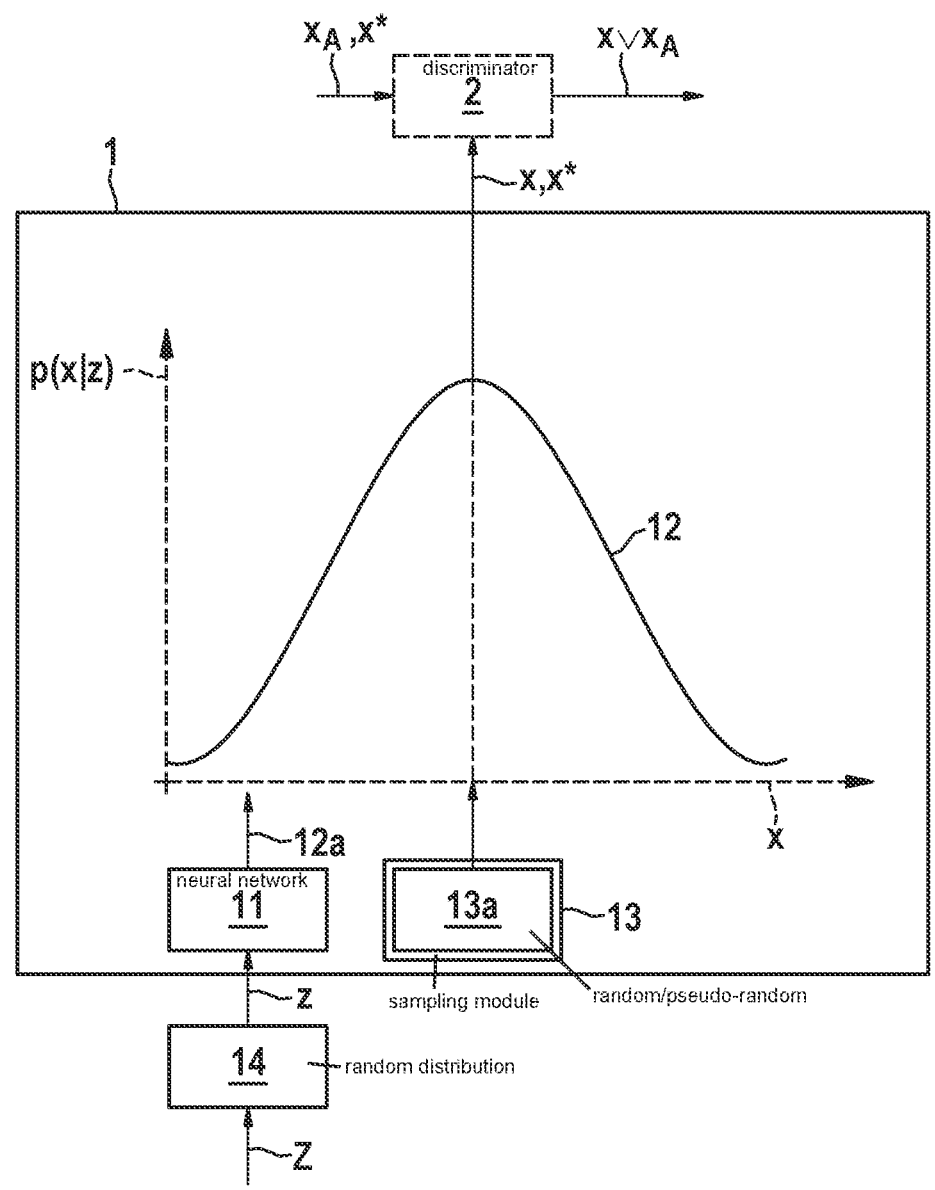
FIG. 1 shows an exemplary embodiment of the generator 1, in accordance with the present invention.

FIG. 1 is a schematic sketch of an embodiment of the generator 1. The generator 1 comprises a neural network 11 and a sampling module 13 with a random or pseudo-random number generator 13a.

In operation, input vectors z are sampled from a random distribution 14 in the latent space Z of the generator 1 and fed into the neural network 11. The neural network 11 maps the input vector z to distribution parameters 12a that characterize a random distribution 12 of realistic measurement data x. For each such x, this random distribution 12 gives a probability p(x|z) with which, given the input vector z, this x will be sampled.

From the random number generator 13a of the sampling module 13, randomness is applied to the random distribution 12, and realistic measurement data x is thereby sampled from this random distribution 12 according to the probability p(x|z).

During training of the generator 1, a discriminator 2 tries to distinguish the realistic measurement data x provided by the generator 1 from actual measurement data $x_A$ of the given application domain and outputs its decision whether the a record x* of measurement data it gets is a record x of generated measurement data or ($\lor$) a record $x_A$ of actual measurement data. After training, the discriminator 2 is no longer needed.

Figure 2:
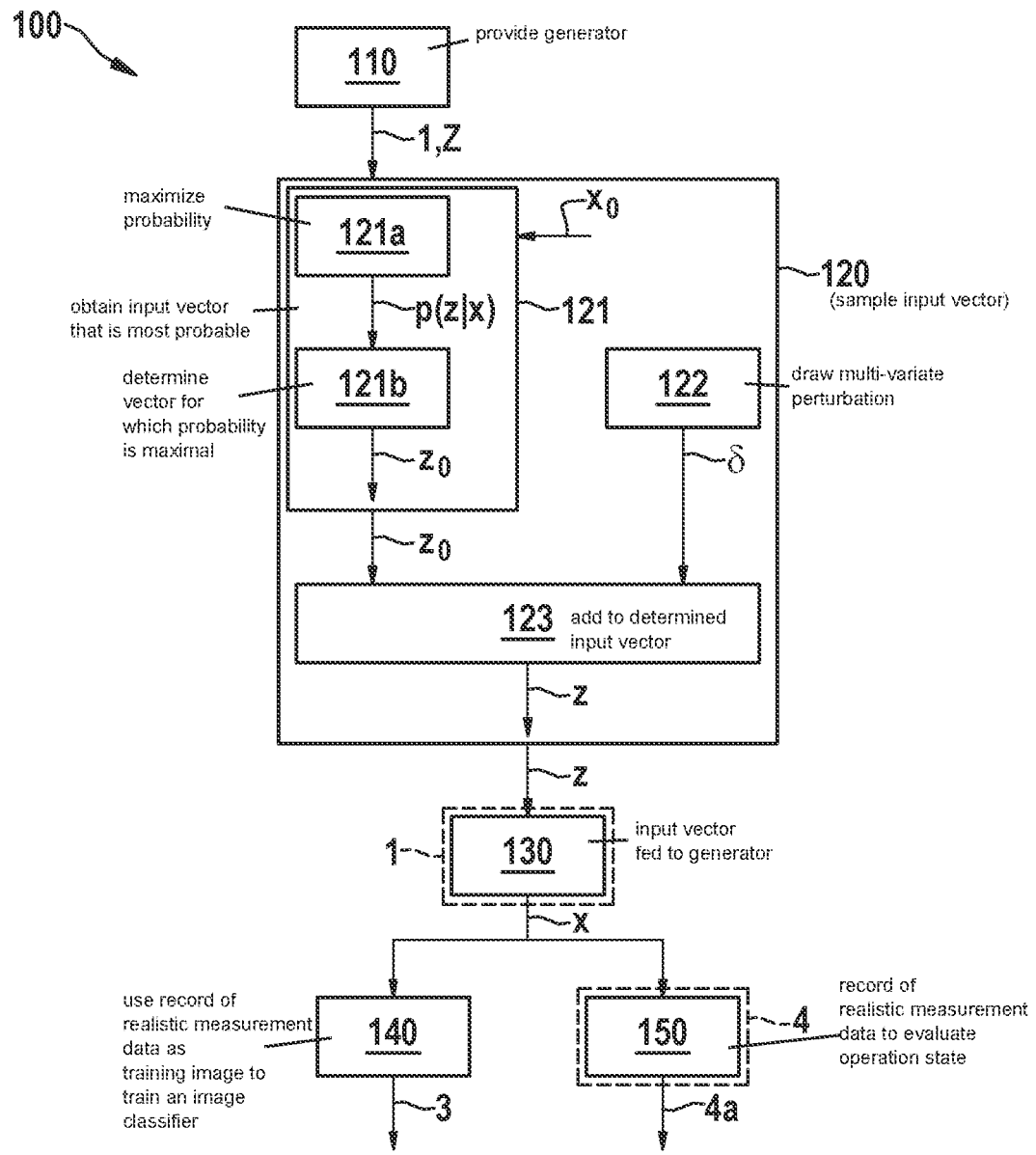
FIG. 2 shows an exemplary embodiment of the method 100 for obtaining realistic measurement data x, in accordance with the present invention.

FIG. 2 is a schematic flow chart of an embodiment of the method 100 for obtaining realistic measurement data x. In step 110, a generator 1 with a latent space Z is provided. In step 120, an input vector z is sampled from this latent space. In step 130, this input vector z is fed to the generator 1, so that the generator 1 produces a record x of realistic measurement data. This record x of realistic measurement data may be used in step 140 as a training image to train an image classifier 3. The record x of realistic measurement data may also be used in step 150 to evaluate the operational state 4a of a technical system 4 based on a fusion with measurement data of other measurement modalities. For example, if actual measurement data of one measurement modality is available for a given point in time, but no actual measurement data of another measurement modality is available for that point in time, the latter may be imputed using generated measurement data x for that measurement modality.

Inside box 120, an exemplary way of obtaining the input vector z is shown. According to block 121, from a given sample $x_0$ of measurement data to which the sought measurement data x shall be similar, the input vector $z_0$ may be obtained that is most probable to be mapped to the given sample $x_0$ when fed to the generator 1. According to block 122, a multi-variate perturbation S may be drawn from a given random distribution, and this may be added to the determined input vector $z_0$ in block 123.

Specifically, according to block 121a, the probability p(z|x) of z given x may be maximized with respect to z. According to block 121b, the vector z for which p(z|x) is maximal may then be determined as the sought input vector $z_0$.

Figure 3:
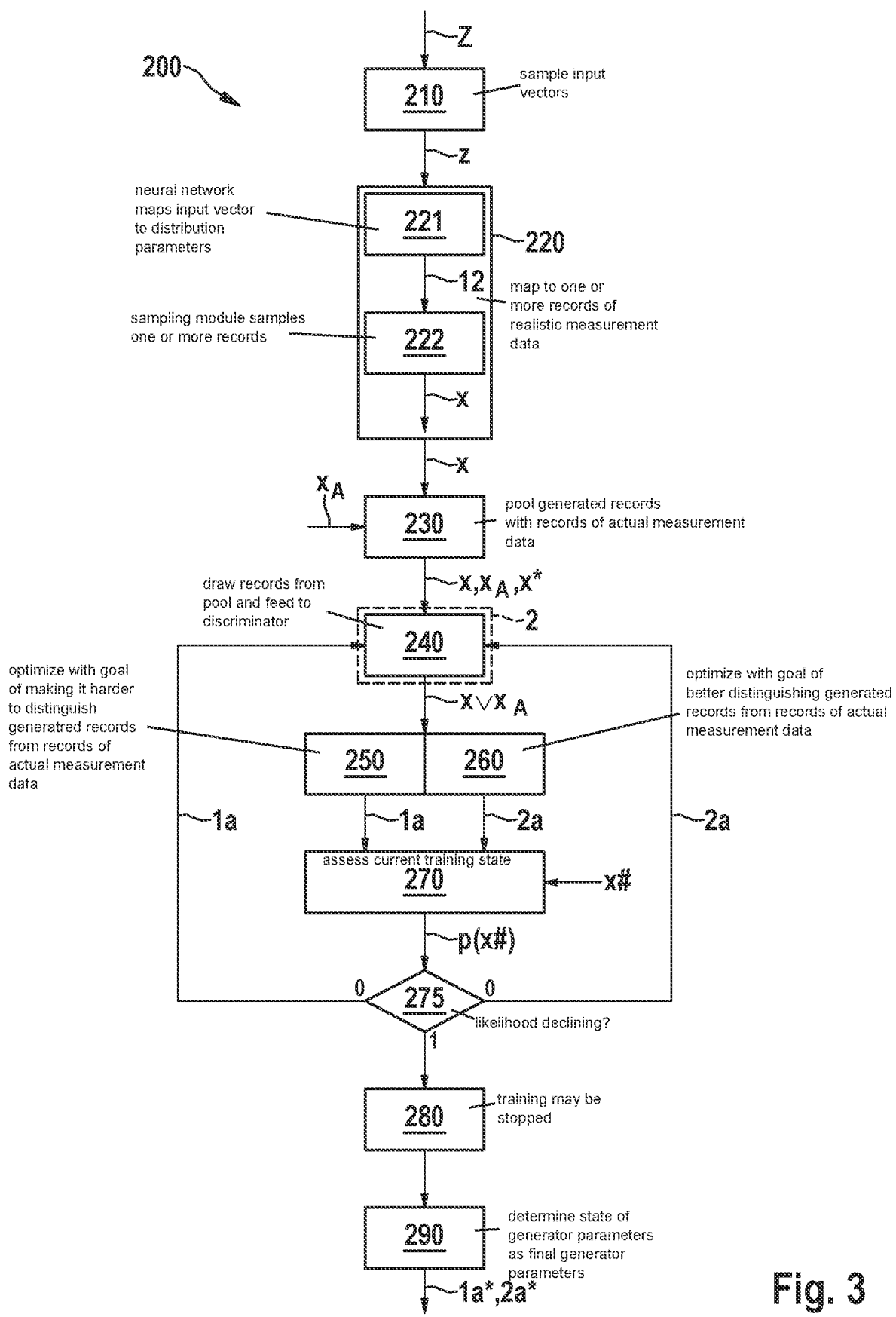
FIG. 3 shows an exemplary embodiment of the method 200 for training the generator 1, in accordance with the present invention.

FIG. 3 is a schematic flow chart of an exemplary embodiment of the method 200 for training a generator 1. In step 210, input vectors z are sampled from the latent space Z of the generator 1. Each such input vector z is mapped to one or more records x of realistic measurement data in step 220. Specifically, according to block 221, the neural network maps the input vector z to distribution parameters 12a of a random distribution 12, and thus to the random distribution 12. According to block 222, the sampling module 13 of the generator 1 samples the one or more records x from this random distribution 12.

In step 230, the generated records x of realistic measurement data are pooled with records $x_A$ of actual measurement data of the application domain in which the records x have been generated. In step 240, records x* from this pool are drawn and fed to the discriminator 2. The discriminator 2 outputs its decision whether the a record x* of measurement data it gets is a record x of generated measurement data or ($\lor$) a record $x_A$ of actual measurement data.

In step 250, generator parameters 1a that characterize the behavior of the generator 1 are optimized with the goal of making it harder for the discriminator 2 to distinguish generated records x from records $x_A$ of actual measurement data. In step 260, discriminator parameters 2a that characterize the behavior of the discriminator 2 are optimized with the goal of better distinguishing generated records x from records $x_A$ of actual measurement data.

The current training state of the generator 1 is assessed in step 270 by determining, for test records x # of actual measurement data that are not used during the optimizing of the generator parameters 1a and discriminator parameters 2a, a likelihood p(x #) that the generator 1, in this particular training state, will output those test records x # as records x of realistic measurement data. The higher this likelihood p(x #), the better the current training state of the generator 1.

In step 275, it is checked whether the likelihood p(x #) is declining. If there is no decline (truth value 0), the training of the generator 1 and discriminator 2 continues based on their current parameters 1a and 2a, respectively. If there is a decline (truth value 1 at diamond 275), in step 280, the training may be stopped, and in step 290, a state of the generator parameters 1a from before the beginning of this decline may be determined as the final generator parameters 1a*. Likewise, the state of the generator parameters 2a from before the beginning of the decline may be determined as the final discriminator parameters 2a*, though the discriminator 2 is necessary only during training.

Figure 4:
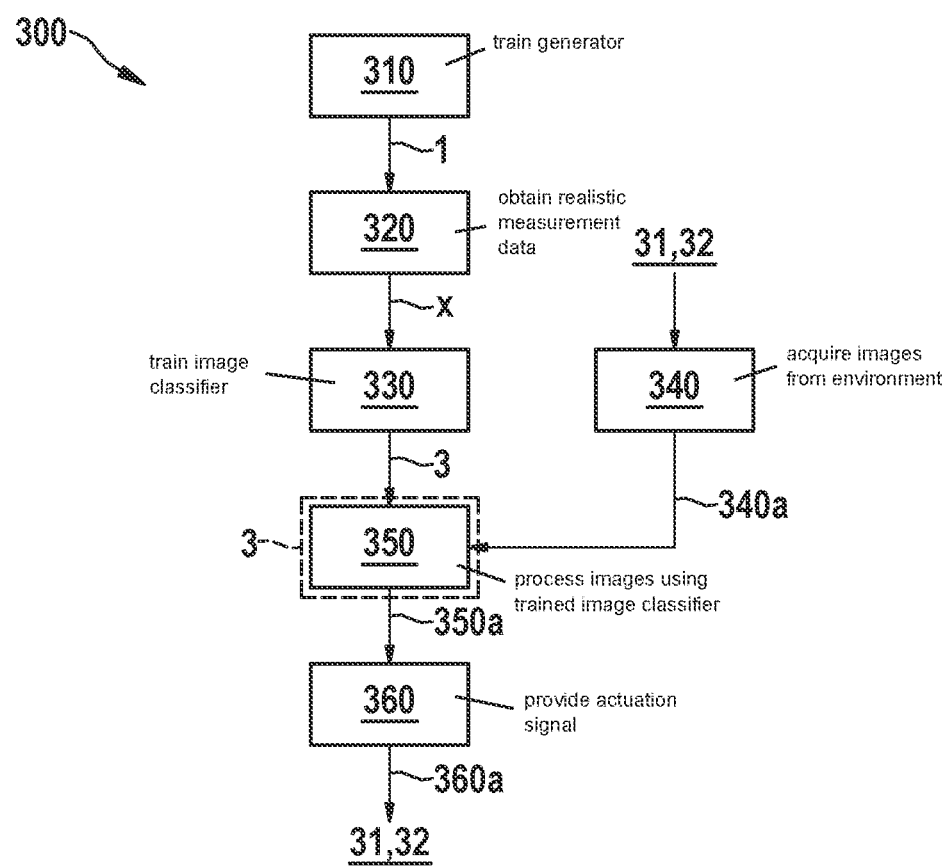
FIG. 4 shows an exemplary embodiment of the method 300 with the complete chain of action up to providing an actuation signal for a vehicle 31 or robot 32, in accordance with the present invention.

FIG. 4 is a schematic flow chart of an exemplary embodiment of the method 300 with the complete chain of action up to actuation of a vehicle 31 or robot 32. In step 310, a generator 1 is trained according to the method 200 discussed above. In step 320, using this trained generator 1, realistic measurement data x is obtained, and in step 330, an image classifier 3 is trained using this realistic measurement data x.

In step 340, images 340a are acquired from the environment of at least one vehicle 31 and/or robot 32 using at least one sensor. These images 340a are processed in step 350 using the trained image classifier 3. In step 360, based on the result 350a of this processing 350, an actuation signal 360a for the at least one vehicle 31 and/or robot 32 may be provided.

What is claimed is:

1. A system comprising:
 a generator for automated training of an image classifier of a machine for autonomous operation by generating one or more records of artificial measurement data, the generator comprising:
  a processor programmed to:
   implement a trained neural network to map each of a plurality of input vectors of a neural network latent space to a respective set of distribution parameters, wherein the set of distribution parameters characterize a random distribution of potential measurement data that is generatable from the respective input vector;
   use a random or pseudo-random number generator as a source of randomness to perform a sampling to select samples from the random distributions;
   generate the one or more records of measurement data from the input vectors using the selected samples of the random distributions; and
   automatedly train the image classifier of the machine for autonomous operation using the one or more records; and
 a processor system, wherein the processor system is configured to:
  use the trained image classifier to process acquired sensor images of a physical environment of a vehicle or robot;
  generate an actuation signal controlling the vehicle or robot based on a result of the processing of the acquired sensor images; and
  use the generator to improve a perception system of the vehicle or robot by generating domain-specific synthetic sensor data that enhances the image classifier's ability to identify objects or events in the physical environment.

2. The generator of claim 1, wherein the neural network includes distinct layers and/or subnetworks that are configured to output different distribution parameters of the set of distribution parameters.

3. The generator of claim 1, wherein the random distribution is a multi-variate Gaussian distribution.

4. The generator of claim 3, wherein the set of distribution parameters includes at least:
 a projection matrix W representing cross-attribute correlation of a probabilistic principle component analysis (PPCA) of the random distribution;
 standard deviations $\sigma I$, each standard deviation $\sigma_i$ representing s per-attribute variation of the PPCA in an observation direction i; and
 a mean $\mu$.

5. The generator of claim 4, wherein:
 the sampling is performed by computing a sample x as $Ws + \mu + \text{diag}(\sigma_i)\in$; and
 s and $\in$ are standard normal variables.

6. A method comprising:
 automatedly training an image classifier of a machine for autonomous operation by generating one or more records of artificial measurement data, the automated training comprising a processor performing the following:
  implementing a trained neural network to map each of a plurality of input vectors of a neural network latent space to a respective set of distribution parameters, wherein the set of distribution parameters characterize a random distribution of potential measurement data that is generatable from the respective input vector;
  using a random or pseudo-random number generator as a source of randomness to perform a sampling to select samples from the random distributions;
  generating the one or more records of measurement data from the input vectors using the selected samples of the random distributions; and
  automatedly training the image classifier of the machine for autonomous operation using the one or more records;
 using the trained image classifier to process acquired sensor images of a physical environment of a vehicle or robot;
 generating an actuation signal controlling the vehicle or robot based on a result of the processing of the acquired sensor images; and
 improving a perception system of the vehicle or robot by generating domain-specific synthetic sensor data that enhances the image classifier's ability to identify objects or events in the physical environment.

7. The method of claim 6, further comprising:
 selecting the plurality of input vectors from the latent space, wherein, for each of at least one of the plurality of input vectors, the selection of the respective one of the plurality of input vectors includes:
  determining, from a given sample of measurement data which of the input vectors of the latent space is an input vector $z_0$ that is most probable to be mapped to the given sample;
  drawing a multi-variate perturbation from a given random distribution; and
  adding the perturbation to the determined input vector $z_0$ to form a new input vector Z.

8. The method of claim 7, wherein the determining of the input vector $z_0$ comprises:
   maximizing, with respect to z, a probability p(z|x) of z given x that is given by $$p(z|x) = \frac{p(x|z)p(z)}{p(x)} \propto p(x|z)p(z),$$

where p (x|z) is the probability of x given z that is obtainable from the random distribution to which the neural network maps z, and p(z) is the probability of z according to a random distribution of z with which the neural network was trained; and
   determining the vector z for which p(z|x) is maximal as the input vector $z_0$.

9. The method of claim 6, wherein the generated one or more records of measurement data includes at least one image.

10. The method of claim 6, wherein the generated one or more records of measurement data includes measurement data in a form of sensor output that is produced by a first sensor type for a situation for which actual measurement data from a second sensor type is available, and the method further comprises: evaluating a current operational state of a technical system based at least in part on a fusion of the generated one or more records of measurement data and the actual measurement data.

11. The method of claim 6, further comprising:
   training the neural network, the training of the neural network comprising the following steps:
      sampling input vectors from the latent space;
      mapping each of the input vectors to one or more generated records of measurement data by sampling the one or more records from the random distribution to which the neural network has mapped the input vector;
      pooling the generated records of measurement data with records of actual measurement data;
      drawing records of measurement data from the pool;
      feeding the drawn records to a discriminator that is configured to decide, for each of the records, whether the respective record is one of the generated records or is one of the records of actual measurement data;
      optimizing first generator parameters that characterize a behavior of the neural network to decrease a percentage of cases in which the discriminator is able to correctly to distinguish whether a record of the respective case is one of the generated record s or is one of the records of actual measurement data; and
      optimizing second discriminator parameters that characterize a behavior of the discriminator to increase the percentage of cases in which the discriminator is able to correctly distinguish whether the record of the respective case is one of the generated records or is one of the records of actual measurement data.

12. The method of claim 11, further comprising:
   determining, for test records of actual measurement data that are not used during the optimizing of the generator and the discriminator parameters, a likelihood that the neural network, in a particular training state, will output the test records as records of measurement data.

13. The method of claim 12, further comprising:
   stopping the training of the neural network in response to a decline in the likelihood, and determining a state of the generator parameters from before a beginning of this decline as final generator parameters.

14. The method of claim 11, wherein the machine for autonomous operation is the vehicle or robot, the method further comprising:
   acquiring the images from the physical environment of the vehicle or robot using at least one sensor; and
   executing, by the vehicle or robot, an automated motion in response to the actuation signal.

15. One or more non-transitory readable media on which are stored instructions that are executable by a processor system including one or more processors and that, when executed by the processor system, cause the processor system to perform a method, the method comprising:
   automatedly training an image classifier of a machine for autonomous operation by generating one or more records of artificial measurement data, the automated training comprising the processor performing the following:
      implementing a trained neural network to map each of a plurality of input vectors of a neural network latent space to a respective set of distribution parameters, wherein the set of distribution parameters characterize a random distribution of potential measurement data that is generatable from the respective input vector;
      using a random or pseudo-random number generator as a source of randomness to perform a sampling to select samples from the random distributions;
      generating the one or more records of measurement data from the input vectors using the selected samples of the random distributions, wherein the generated one or more records of measurement data enhance perception of objects or events in a physical external environment of a vehicle or robot; and
      automatedly training the image classifier of the machine for autonomous operation using the one or more records, wherein the training trains the image classifier to classify sensor-acquired images of the physical external environment of a vehicle or a robot into one or more predetermined classes;
   using the trained image classifier to process the sensor-acquired images of the physical external environment of the vehicle or robot, thereby producing at least one classification score;
   improving a perception system of the vehicle or robot by generating domain-specific synthetic sensor data that enhances the image classifier's ability to identify objects or events in the physical external environment;
   generating an actuation signal controlling the vehicle or robot based on the at least one classification score, wherein the controlling causes the vehicle or robot to execute a context-specific action selected based on the identified objects or events.

16. The method of claim 1, further comprising:
   obtaining at least one image as measurement data specific to a given application domain for the supervised training of an image classifier or any other machine learning model in this given application domain, by performing the following steps:
      sampling an input vector from a latent space; and
      feeding the sampled input vector to a trained generator module that, when executed by the processor, causes the processor to:
         convert the fed sampled input vector to one or more records of measurement data;

execute a trained neural network that is configured to map the input vector to a set of distribution parameters that characterize a random distribution of domain-specific measurement data, the random distribution being configured such that, given the set of distribution parameters and at least one source of randomness, samples of domain-specific measurement data are obtained; and use a random or pseudo-random number generator as a source of randomness to sample the domain-specific measurement data from the random distribution;

wherein the sampling of the input vector includes:
determining, from a given sample of measurement data to which a sought measurement data is to be similar, an input vector that is most probable to be mapped to the given sample when fed to the trained generator;
drawing a multivariate perturbation from a given random distribution; and
adding the perturbation to the determined input vector to form a new input vector.

17. The method of claim 1, wherein the trained generator module is one that has been trained by a method that includes:

sampling input vectors from the latent space of the generator;

mapping each of the sampled input vectors to one or more images as records of domain-specific measurement data by sampling the one or more records from the random distribution to which the neural network of the generator has mapped the input vector;

pooling the generated records of domain-specific measurement data with records of actual measurement data of the application domain in which the records have been generated;

drawing records of measurement data from this pool and feeding these records to a discriminator that is configured to decide whether a record is a generated record x or a record of actual measurement data;

optimizing generator parameters that characterize the behavior of the generator with the goal of making it harder for the discriminator to distinguish generated records from records of actual measurement data; and optimizing discriminator parameters that characterize the behavior of the discriminator, wherein the optimization optimizes a distinguishability of generated records from records of actual measurement data.

* * * * *